(12) United States Patent
Lundqvist et al.

(10) Patent No.: US 9,007,257 B2
(45) Date of Patent: Apr. 14, 2015

(54) METHOD FOR VARIABLE CONTROL OF A ZONE SENSOR IN A COMBAT AIRCRAFT

(75) Inventors: Anders Lundqvist, Vaxholm (SE); Vibeke Kensing, Vikingstad (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 14/371,955

(22) PCT Filed: Feb. 8, 2012

(86) PCT No.: PCT/SE2012/050118
§ 371 (c)(1),
(2), (4) Date: Sep. 12, 2014

(87) PCT Pub. No.: WO2013/119151
PCT Pub. Date: Aug. 15, 2013

(65) Prior Publication Data
US 2015/0009061 A1    Jan. 8, 2015

(51) Int. Cl.
G01S 13/00    (2006.01)
G01S 13/04    (2006.01)

(52) U.S. Cl.
CPC ..................................... *G01S 13/04* (2013.01)

(58) Field of Classification Search
USPC ...................................................... 342/27, 89
See application file for complete search history.

(56) References Cited

U.S. PATENT DOCUMENTS

| | | | |
|---|---|---|---|
| 4,891,648 A | 1/1990 | Jehle et al. | |
| 5,047,779 A | 9/1991 | Hager | |
| 5,122,801 A | 6/1992 | Hughes | |
| 5,418,364 A | 5/1995 | Hale et al. | |
| 2006/0219094 A1* | 10/2006 | Padan | 89/37.16 |
| 2008/0191127 A1 | 8/2008 | Fine et al. | |

FOREIGN PATENT DOCUMENTS

EP    1688698 A1    8/2006

OTHER PUBLICATIONS

International Searching Authority, International Search Report and Written Opinion for International Application No. PCT/SE2012/050118, Oct. 26, 2012, 10 pages, Swedish Patent and Registration Office, Sweden.
International Preliminary Examining Authority, International Preliminary Report on Patentability for International Application No. PCT/SE2012/050118, Jan. 8, 2014, 5 pages, Swedish Patent and Registration Office, Sweden.

\* cited by examiner

*Primary Examiner* — Timothy A Brainard
(74) *Attorney, Agent, or Firm* — Alston & Bird LLP

(57) ABSTRACT

The invention relates to a method for controlling a sensor in a combat aircraft (1) comprising the steps of: a) determining (3) direction and size of a defence zone around the combat aircraft (1) based on a plurality of characteristic parameters of an enemy combat aircraft (2), b) determining (4) direction and size of at least one offence zone around the combat aircraft (1) based on the plurality of characteristic parameters of the enemy combat aircraft (2), and c) controlling (5) the sensor in the combat aircraft (1) according to emission level and detection capacity within at least one of the defence zone and the at least one offence zone. In this way, the sensors are controlled reliably and thus the pilot can act and react mission-oriented.

14 Claims, 1 Drawing Sheet

METHOD FOR VARIABLE CONTROL OF A ZONE SENSOR IN A COMBAT AIRCRAFT

CROSS REFERENCE TO RELATED APPLICATIONS

This application is a National Stage Application, filed under 35 U.S.C. §371, of International Application No. PCT/SE2012/050118, filed Feb. 8, 2012, the contents of which are hereby incorporated by reference in their entirety.

BACKGROUND

1. Related Field

The invention relates to a method for controlling a sensor in a combat aircraft.

2. Description of Related Art

Document EP 1688698 A1 describes a method which involves determining a drift according to environment data of a sensor, a communication unit and/or an arm system carried by a vehicle. A mapping software is implemented to display on a screen a terrain zone around a schematic representation of the vehicle. A surface or a curve appears on the screen to display the drift of the sensor, the communication unit, the arm system and/or the detectability of the vehicle.

Highly developed functions for human machine interface, HMI for short, and decision support as supporting functions for the pilot environment in combat aircraft are known. All solutions are based on and adapted for high speed in flight and combat situations in which HMI and decision support together describe the current position and provide the pilot with tools and solutions. Current solutions are based on the aircraft itself and its available resources and tools. Sensors, such as radar, are operated by the pilot as a tool for scanning the near field for objects for the purpose of identification and continued pursuit. Decision support typically supports the multi-use of sensors by merging objects detected by several different sensors and comparing, correlating and/or combining these objects in one situation overview. This is usually done via networks in further steps to create a common situation overview between aircraft within an aircraft group.

When complexity increases because more tools and/or sensors are supplied, the possibilities available to the pilot to control his tools and/or sensors in time are limited and made difficult. In time-critical situations, for instance in air combat, the pilot risks becoming the underdog. Another limitation is the fact that each tool and/or sensor has its own characteristics and peculiarities. Each sensor and/or tool therefore requires its own interface and control functions which the pilot needs to be able to understand and use correctly.

BRIEF SUMMARY

It is the object of the invention to provide a possibility to switch sensors reliably between a defensive zone and an offensive zone of a combat aircraft such that the pilot can act and react mission-oriented.

This object is achieved by the subject matter of independent claim 1. Preferred embodiments are defined in the sub claims.

According to an aspect of the invention, above mentioned object is achieved by a method for controlling a sensor in a combat aircraft comprising the steps of: a) determining direction and size of a defence zone around the combat aircraft based on a plurality of characteristic parameters of an enemy combat aircraft, b) determining direction and size of at least one offence zone around the combat aircraft based on the plurality of characteristic parameters of the enemy combat aircraft, and c) controlling the sensor in the combat aircraft according to emission level and detection capacity within at least one of the defence zone and the at least one offence zone.

It is an idea of the invention that the environment of the combat aircraft is divided into fields and/or zones. Around every aircraft there is a defence zone and at least one offence zone. The sensors of the aircraft interact on the basis of information on the respective zones. When performing step a) the countermeasure capacity, i.e. the capacity of the own combat aircraft, is preferably taken into account. This corresponds to the volume of interest or area of interest, wherein a tracking is not needed or not necessary. When performing step b) the set search area, i.e. the target of interest, of the enemy combat aircraft is preferably taken into account, wherein a tracking is performed.

According to a preferred embodiment of the invention, the method comprises the step of managing the resources needed for the defence zone and the at least one offence zone in time domain and/or in sensor domain.

According to a preferred embodiment of the invention, the plurality of characteristic parameters of the enemy combat aircraft comprises type, sensor capacity, speed, position and/or environmental conditions.

Further, according to a preferred embodiment of the invention, the method comprises the step of recording the defence zone and the at least one offence zone, wherein the recorded data is adapted for generating a situation picture. Preferably, the step of displaying the recorded data corresponds to displaying a plurality of situation pictures.

According to a preferred embodiment of the invention, the diameter of the defence zone is set on the basis of the range and degree of danger of the enemy combat aircraft. Preferably, the at least one offence zone is set on the basis of the set search area of the enemy combat aircraft. The set search area corresponds to the volume of interest of the enemy combat aircraft.

According to a preferred embodiment of the invention, the emission level and the detection capacity are controlled by weighting of the defence zone and the at least one offence zone. Weighting is preferably done manually by the pilot of the combat aircraft or preferably automatically by an implemented decision support system. During the step of controlling the sensor is preferably switched between the defence zone and the at least one offence zone when a predefined probabilistic value comprising at least one predefined criterion is exceeded. The predefined criterion preferably comprises a predefined attitude limit, a predefined speed limit, a detection criterion, an identification criterion and/or a behaviour criterion of an enemy combat aircraft.

According to a preferred embodiment of the invention, the sensor is controlled on the basis of calculating and allocating at least one quality factor for at least one combat sensor of the combat aircraft and calculating and allocating at least one signature factor for at least one enemy sensor of the enemy combat aircraft based on a predetermined model, wherein each quality factor is adapted for indicating identification ability of a combat sensor and each signature factor is adapted for indicating identification ability of an enemy sensor. The predetermined model preferably comprises one of the probabilistic model and a linear model.

According to a preferred embodiment of the invention, the shape radius of the defence zone comprises a cylindrical shape and is set constant in time domain taking into account speed and heading of the combat aircraft and of the enemy combat aircraft. According to other preferred embodiments of the invention, the shape radius of the defence zone comprises a cylindrical shape and varies in time domain taking into account speed and heading of the combat aircraft and of the enemy combat aircraft.

According to a preferred embodiment of the invention, the enemy combat aircraft corresponds to an enemy object, such as an enemy missile launch from an enemy helicopter, an enemy unmanned aerial vehicle or an enemy ground station.

It is an idea of the invention that the aircraft is split in an offensive and into a defensive part dependent on the situation. In the defence zone the pilot should be alerted. The pilot shall become able to act and/or react mission-oriented. Typically there are multiple offence zones which means that there are multiple duels but there is one defence zone in order to be survival-oriented. The defence zone and the at least one offence zone are independent and/or uncorrelated to one another.

BRIEF DESCRIPTION OF THE FIGURES

These and other aspects of the invention will be apparent from and elucidated with reference to the embodiments described hereinafter.

In the drawings.

DETAILED DESCRIPTION OF VARIOUS EMBODIMENTS

Figure 1:
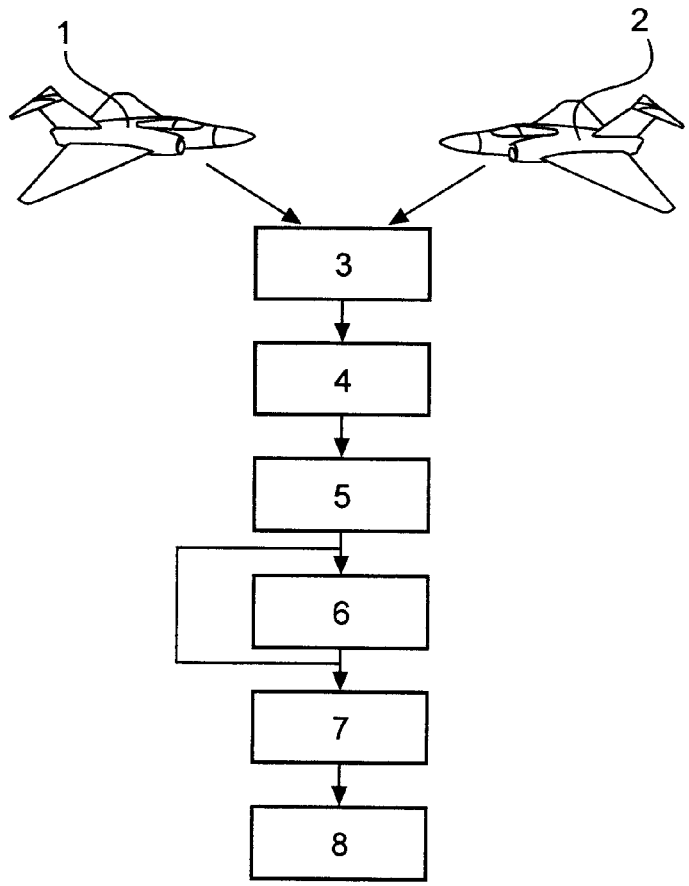
FIG. 1 illustrates the steps of a method for controlling a sensor in a combat aircraft according to a preferred embodiment of the invention.

FIG. 1 illustrates the steps of a method for controlling a sensor in a combat aircraft according to a preferred embodiment of the invention. In a first step direction and size of a defence zone around the combat aircraft 1 based on a plurality of characteristic parameters of an enemy combat aircraft 2 are determined 3. The plurality of characteristic parameters of the enemy combat aircraft 2 comprises type, sensor capacity or possible further parameters according to the preferred embodiment of the invention. In a second step, direction and size of at least one offence zone around the combat aircraft 1 based on the plurality of characteristic parameters of the enemy combat aircraft 2 is determined 4. Finally, the sensor in the combat aircraft 1 is controlled 5 according to emission level and detection capacity within at least one of the defence zone and the at least one offence zone. In further steps, the method can comprise the steps of managing 6 the resources needed for the defence zone and the at least one offence zone in time domain and/or in sensor domain and/or the step of recording 7 the defence zone and the at least offence zone in order to generate a plurality of situation pictures and further to display 8 the recorded data.

Figure 2:
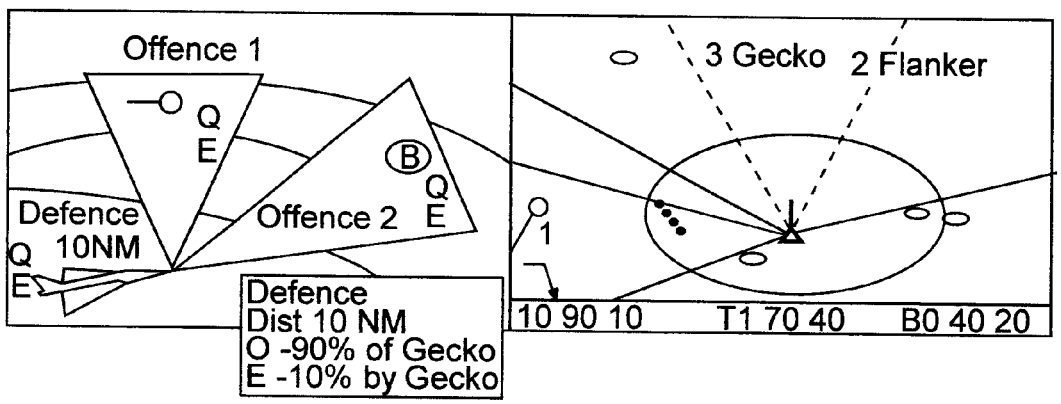
FIG. 2 shows the control of a defence zone according to another preferred embodiment of the invention.

FIG. 2 shows the control of a defence zone according to another preferred embodiment of the invention. The defence zone is controlled on the basis of the prioritized alternatively selected type threat in the area. It consists of a vertical cylinder around the combat aircraft according to this preferred embodiment of the invention. The diameter of the defence zone is set on the basis of the range and degree of danger of the threat, according to this preferred embodiment of the invention to a value of 20 km. The plurality of offence zones are controlled on the basis of objects, such as detected targets or by indicating a bearing from one's own aircraft, thereby creating a search area for targets as yet undetected. According to this preferred embodiment of the invention the aircraft shows one defence zone and warnings and/or alarms are triggered within this single defence zone. According to this preferred embodiment of the invention a number of offence zones is provided and constitutes the basis of the mission of the aircraft. The pilot controls how the task of the aircraft is to be accomplished in the emission concerned through the aid of these offence zones. The ambition, such as efficiency and intensity coupled with emission level, of the sensors and their prioritization, such as the prioritization of the targets and target pursuit, are controlled by weighting of the different zones. According to this preferred embodiment of the invention the weighting is automated by means of decision support. According to other preferred embodiments of the invention the weighting is set manually by the pilot.

The sensors operate differently in each field, depending on the perceived expectation of the threat and target based on target classification, distance or task prioritization, for the respective fields. The general objective and/or prioritization regulate(s) the mutual relationship between the different zones and a weighting regulates the conflict of resources.

In this way, the focus of the pilot is transferred from handling sensors to working tactically with objects in the situation overview. The pilot becomes object-focused instead of tool-focused. It is thus an idea of the invention to reduce the work of the pilot in controlling sensors which releases working capacity for other tasks.

While the invention has been illustrated and described in detail in the drawings and foregoing description, such illustration and description are to be considered illustrative or exemplary and not restrictive and it is not intended to limit the invention to the disclosed embodiments. The mere fact that certain measures are recited in mutually different dependent claims does not indicate that a combination of these measures cannot be used advantageously.

The invention claimed is:

1. A method for controlling a sensor in a combat aircraft (1), the method comprising the steps of:
    determining (3) direction and size of a defense zone around the combat aircraft (1) based on a plurality of characteristic parameters of an enemy combat aircraft (2);
    determining (4) direction and size of at least one offense zone around the combat aircraft (1) based on the plurality of characteristic parameters of the enemy combat aircraft (2); and
    controlling (5) the sensor in the combat aircraft (1) according to emission level and detection capacity within at least one of the defense zone and the at least one offense zone.

2. The method according to claim 1, further comprising the step of managing (6) the resources needed for the defense zone and the at least one offense zone in at least one of time domain or sensor domain.

3. The method according to claim 1, wherein the plurality of characteristic parameters of the enemy combat aircraft (2) comprises at least one of type conditions, sensor capacity conditions, speed conditions, position conditions, or environmental conditions.

4. The method according to claim 1, further comprising the step of recording (7) the defense zone and the at least one offense zone, wherein the recorded data is configured for generating a situation picture.

5. The method according to claim 4, further comprising the step of displaying (8) the recorded data corresponding to displaying a plurality of situation pictures.

6. The method according to claim 1, wherein the diameter of the defense zone is set on the basis of the range and degree of danger of the enemy combat aircraft (2).

7. The method according to claim 6, wherein a shape radius of the defense zone comprises a cylindrical shape and is set constant in time domain taking into account speed and heading of the combat aircraft (1) and of the enemy combat aircraft (2).

8. The method according to claim 6, wherein a shape radius of the defense zone comprises a cylindrical shape and varies in time domain taking into account speed and heading of the combat aircraft (1) and of the enemy combat aircraft (2).

9. The method according to claim 1, wherein the at least one offense zone is set on the basis of the set search area of the enemy combat aircraft (2).

10. The method according to claim 1, wherein the emission level and the detection capacity are controlled by weighting of the defense zone and the at least one offense zone.

11. The method according to claim 10, wherein the weighting is done at least one of manually by the pilot of the combat aircraft (1) or automatically by an implemented decision support system.

12. The method according to claim 1, wherein, during the step of controlling (5), the sensor is switched between the defense zone and the at least one offense zone when a predefined probalistic value comprising at least one predefined criterion is exceeded.

13. The method according to claim 1, wherein:
- the sensor is controlled on the basis of calculating and allocating at least one quality factor for at least one combat sensor of the combat aircraft (1) and calculating and allocating at least one signature factor for at least one enemy sensor of the enemy combat aircraft (2) based on a predetermined model;
- each quality factor is configured for indicating identification ability of a combat sensor; and
- each signature factor is configured for indicating identification ability of an enemy sensor.

14. The method according to claim 1, wherein the enemy combat aircraft (2) corresponds to an enemy object, such as an enemy missile launch from an enemy helicopter, an enemy unmanned aerial vehicle, or an enemy ground station.

\* \* \* \* \*